US009815176B2

(12) United States Patent
Konovalov

(10) Patent No.: US 9,815,176 B2
(45) Date of Patent: Nov. 14, 2017

(54) POLYCRYSTALLINE DIAMOND COMPACT FABRICATED FROM SURFACE FUNCTIONALIZED DIAMOND PARTICLES

(71) Applicant: DIAMOND INNOVATIONS, INC., Worthington, OH (US)

(72) Inventor: Valeriy V. Konovalov, Lewis Center, OH (US)

(73) Assignee: DIAMOND INNOVATIONS, INC., Worthington, OH (US)

(*) Notice: Subject to any disclaimer, the term of this patent is extended or adjusted under 35 U.S.C. 154(b) by 470 days.

(21) Appl. No.: 14/061,341

(22) Filed: Oct. 23, 2013

(65) Prior Publication Data

US 2015/0107163 A1  Apr. 23, 2015

(51) Int. Cl.

| | | |
|---|---|---|
| *C09K 3/14* | (2006.01) | |
| *B24D 3/34* | (2006.01) | |
| *B24D 18/00* | (2006.01) | |
| *B24D 99/00* | (2010.01) | |
| *E21B 10/567* | (2006.01) | |
| *C04B 35/52* | (2006.01) | |
| *C04B 35/645* | (2006.01) | |
| *C04B 35/5831* | (2006.01) | |
| *C04B 35/626* | (2006.01) | |
| *C04B 35/628* | (2006.01) | |

(52) U.S. Cl.
CPC ........... *B24D 3/34* (2013.01); *B24D 18/0009* (2013.01); *B24D 99/005* (2013.01); *C04B 35/52* (2013.01); *C04B 35/5831* (2013.01); *C04B 35/6268* (2013.01); *C04B 35/62802* (2013.01); *C04B 35/645* (2013.01); *E21B 10/567* (2013.01); *C04B 2235/427* (2013.01); *C04B 2235/5436* (2013.01)

(58) Field of Classification Search
None
See application file for complete search history.

(56) References Cited

U.S. PATENT DOCUMENTS

| | | | |
|---|---|---|---|
| 7,820,130 B2 | 10/2010 | Khabashesku et al. | |
| 2011/0252711 A1 | 10/2011 | Chakraborty et al. | |
| 2011/0252712 A1* | 10/2011 | Chakraborty ........... B01J 3/062 51/298 |
| 2011/0252713 A1 | 10/2011 | Chakraborty et al. | |

FOREIGN PATENT DOCUMENTS

| | | |
|---|---|---|
| JP | 2004168871 A | 6/2004 |
| WO | 200247121 A | 6/2002 |

* cited by examiner

*Primary Examiner* — Kaj K Olsen
*Assistant Examiner* — Ross J Christie
(74) *Attorney, Agent, or Firm* — Eric Shaffer

(57) ABSTRACT

A superabrasive compact and a method of making the superabrasive compact are disclosed. A superabrasive compact may include a plurality of polycrystalline superabrasive particles made of surface functionalized superabrasive particles. The surface functionalized superabrasive particles may have halogens or organic moiety instead of hydrogen.

11 Claims, 3 Drawing Sheets

POLYCRYSTALLINE DIAMOND COMPACT FABRICATED FROM SURFACE FUNCTIONALIZED DIAMOND PARTICLES

TECHNICAL FIELD AND INDUSTRIAL APPLICABILITY

The present invention relates generally to superabrasive materials and a method of making superabrasive materials, and more particularly, to polycrystalline diamond compacts (PDC) made from surface functionalized diamond particle.

SUMMARY

In one embodiment, a superabrasive compact may comprise a plurality of polycrystalline superabrasive particles made of surface functionalized superabrasive particles, wherein surface functionalized superabrasive particles comprise inorganic or organic moiety; and a substrate attached to a superabrasive volume formed by the polycrystalline superabrasive particles.

In another embodiment, a method may comprise steps of providing a plurality of diamond particles; halogenating the surface of diamond particles in such a way that halogen atoms are bonded to the surface of diamond particles; providing a substrate attached to a volume formed by the plurality of surface halogenated diamond particles; and subjecting the substrate and the volume to conditions of high temperature and high pressure suitable for producing the polycrystalline superabrasive compacts. More particularly, surface halogenation may include the bonding to the surface of diamond particles such halogen atoms as chlorine or fluorine.

In yet another embodiment, a superabrasive compact may comprise a plurality of superabrasive particles made from surface functionalized superabrasive particles, wherein the surface functionalized superabrasive particles have halogen atoms or chemical groups bonded to the surface of superabrasive particles.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
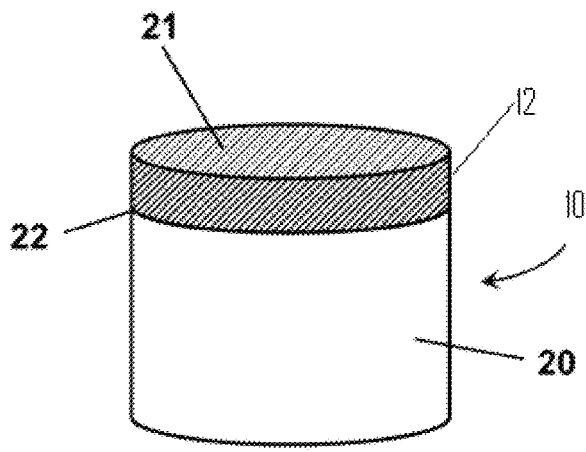
FIG. 1 is schematic perspective view of a cylindrical shape polycrystalline compact produced in a high pressure high temperature (HPHT) process according to an embodiment.

Before the description of the embodiment, terminology, methodology, systems, and materials are described; it is to be understood that this disclosure is not limited to the particular terminologies, methodologies, systems, and materials described, as these may vary. It is also to be understood that the terminology used in the description is for the purpose of describing the particular versions of embodiments only, and is not intended to limit the scope of embodiments. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, about 50% means in the range of 45%-55%.

As used herein, the term "superabrasive particles" may refer to ultra-hard particles or superabrasive particles having a Knoop hardness of 3500 KHN or greater. The superabrasive particles may include diamond and cubic boron nitride, for example. The term "abrasive", as used herein, refers to any material used to wear away softer material.

The term "particle" or "particles", as used herein, refers to a discrete body or bodies. A particle is also considered a crystal or a grain.

The term "halogen", as used herein, is a group name for specific chemical compounds/elements and it refers to one of the following group members: "fluorine", "chlorine", "bromine", or "iodine".

The term "superabrasive compact", as used herein, refers to a sintered product made using super abrasive particles, such as diamond feed or cubic boron nitride particles. The compact may include a support, such as a tungsten carbide support, or may not include a support. The "superabrasive compact" is a broad term, which may include cutting element, cutters, or polycrystalline cubic boron nitride insert.

The term "cutting element", as used herein, means and includes any element of an earth-boring tool that is used to cut or otherwise disintegrate formation material when the earth-boring tool is used to form or enlarge a bore in the formation.

The term "earth-boring tool", as used herein, means and includes any tool used to remove formation material and form a bore (e.g., a wellbore) through the formation by way of the removal of the formation material. Earth-boring tools include, for example, rotary drill bits (e.g., fixed-compact or "drag" bits and roller cone or "rock" bits), hybrid bits including both fixed compacts and roller elements, coring bits, percussion bits, bi-center bits, reamers (including expandable reamers and fixed-wing reamers), and other so-called "hole-opening" tools.

The term "feed" or "diamond feed", as used herein, refers to any type of diamond particles, or diamond powder, used as a starting material in further synthesis of PDC compacts.

The term "polycrystalline diamond", as used herein, refers to a plurality of randomly oriented monocrystalline diamond particles, which may represent a body or a particle consisting of a large number of smaller monocrystalline diamond particles of any sizes. Polycrystalline diamond particles usually do not have cleavage planes.

The term "superabrasive", as used herein, refers to an abrasive possessing superior hardness and abrasion resistance. Diamond and cubic boron nitride are examples of superabrasives and have Knoop indentation hardness values of over 3500.

The terms "diamond particle" or "particles" and "diamond powder", which is a plurality of a large number of single crystal or polycrystalline diamond particles, are used synonymously in the instant application and have the same meaning as "particle" defined above.

In another embodiment, polycrystalline diamond particles may be subjected to the modification treatment discussed below. The sizes of the individual polycrystalline diamond particles may range from about 0.005 to about 1000 microns.

In still another embodiment, carbon particles comprising amorphous carbon, hard diamond like amorphous carbon, and crystalline diamond particles, may be subjected to the modification treatment discussed below. The sizes of the individual carbon particles may range from about 0.005 to about 1000 microns.

Polycrystalline diamond compact (or "PDC", as used hereafter) may represent a volume of crystalline diamond grains with embedded foreign material filling the inter-grain space. In one particular case, a compact comprises crystalline diamond grains, bound to each other by strong diamond-to-diamond bonds and forming a rigid polycrystalline diamond body, and the inter-grain regions, disposed between the bounded grains and filled in one part with a catalyst material (e.g. cobalt or its alloys), which was used to promote diamond bonding during fabrication, and in other part filled with other materials which may remain after the sintering of diamond compact. Suitable metal solvent catalysts may include the iron group transitional metal in Group VIII of the Periodic table. In another particular case, a polycrystalline diamond composite compact comprises a plurality of crystalline diamond grains, which are not bound to each other, but instead are bound together by foreign bonding materials such as borides, nitrides, carbides, and others, e.g. by silicon carbide bonding material.

Polycrystalline diamond compacts (or PDC compacts) may be fabricated in different ways and the examples discussed herein do not limit a variety of different types of diamond composites and PDC compacts which may be produced according to an embodiment. In one particular example, polycrystalline compacts are formed by placing a mixture of diamond powder with a suitable solvent catalyst material (e.g. cobalt powder) on the top of WC—Co substrate, the assembly is then subjected to conditions of HPHT process, where the solvent catalyst promotes desired inter-crystalline diamond-to-diamond bonding resulted in the formation of a rigid polycrystalline diamond body and, also, provides a binding between polycrystalline diamond body and WC—Co substrate.

In another particular example, a polycrystalline diamond compact is formed by placing diamond powder without a catalyst material on the top of substrate containing a catalyst material (e.g. WC—Co substrate). In this example, necessary cobalt catalyst material is supplied from the substrate and melted cobalt is swept through the diamond powder during the HPHT process. In still another example, a hard polycrystalline diamond composite compact is fabricated by forming a mixture of diamond powder with silicon powder and the mixture is subjected to HPHT process, thus forming a dense polycrystalline compact where diamond particles are bound together by newly formed SiC material.

The presence of catalyst materials inside of the polycrystalline diamond body promotes the degradation of the cutting edge of the compact during the cutting process, especially if the edge temperature reaches a high enough critical value. It is theorized that the cobalt driven degradation may be caused by the large difference in thermal expansion between diamond and catalyst (e.g. cobalt metal), and also by the catalytic effect of cobalt on diamond graphitization. Removal of catalyst from the polycrystalline diamond body of PDC compact, for example, by chemical etching in acids, leaves an interconnected network of pores and a residual catalyst (up to about 10 vol %) trapped inside the polycrystalline diamond body. It has been demonstrated that depletion of cobalt from the polycrystalline diamond body of the PDC compact significantly improves a compact's abrasion resistance. Thus, it is theorized that a thicker cobalt depleted layer near the cutting edge, such as more than about 100 µm provides better abrasion resistance of the PDC compact than a thinner cobalt depleted layer, such as less than about 100 µm.

A superabrasive compact 10 in accordance with a current embodiment is shown in FIG. 1. Superabrasive compact 10 may be inserted into a downhole of a suitable tool, such as a drill bit, for example. One example of the superabrasive compact 10 may include a superabrasive volume 12 having a top surface 21. The superabrasive compact may comprise a plurality of polycrystalline superabrasive particles made of superabrasive particles with a functionalized surface. The surface of a functionalized superabrasive particle may comprise an inorganic or organic moiety, such as an atom or molecular group, bonded to the surface of superabrasive particle.

In one example, the inorganic moiety may comprise halogen atoms, selected from the group of chlorine, fluorine, bromine, iodine, bonded to the surface of diamond particles. In another example, the inorganic moiety may be selected from the group of oxygen, nitrogen, silicon or other atoms bonded to the surface of diamond particles. In still another example, the organic moiety may be selected from the group of molecular, such as vinyl, amine, amide, imine, imide, alcohol, phenolic, carboxyl, aldehyde, epoxide, or combinations thereof.

In one embodiment, the superabrasive compact may be a standalone compact without a substrate. In another embodiment, the superabrasive compact 10 may include a substrate 20 attached to the superabrasive volume 12 formed by polycrystalline superabrasive particles. The substrate 20 may be metal carbide, attached to the superabrasive volume 12 via an interface 22 separating the superabrasive volume 12 and the metal carbide. Substrate 20 may be made from cemented cobalt tungsten carbide, or tungsten carbide, while the superabrasive volume 12 may be formed from a polycrystalline ultra-hard material, such as polycrystalline diamond, polycrystalline cubic boron nitride ("PCBN"), tungsten carbide mixed with diamond crystals (impregnated segments), or diamond crystals bonded by a foreign material. The superabrasive particles may be selected from a group of cubic boron nitride, diamond, and diamond composite materials.

The superabrasive compact 10 may be fabricated according to processes known to persons having ordinary skill in the art. Methods for making diamond compacts and composite compacts are more fully described in U.S. Pat. Nos. 3,141,746; 3,745,623; 3,609,818; 3,850,591; 4,394,170; 4,403,015; 4,794,326; and 4,954,139.

The compact 10 may be referred to as a polycrystalline diamond compact ("PDC") compact when polycrystalline diamond is used to form the polycrystalline volume 12. PDC compacts are known for their toughness and durability, which allow them to be an effective cutting insert in demanding applications. Although one type of superabrasive compact 10 has been described, other types of superabrasive compacts 10 may be utilized. For example, in one embodiment, superabrasive compact 10 may have a chamfer (not shown) around an outer peripheral of the top surface 21. The chamfer may have a vertical height of about 0.5 mm and an angle of about 45° degrees, for example, which may provide a particularly strong and fracture resistant tool component. In another embodiment, the superabrasive compact 10 may be a subject of procedure depleting catalyst metal (e.g. cobalt) near the cutting surface of the compact, for example chemical leaching of cobalt in acidic solutions.

Figure 2:
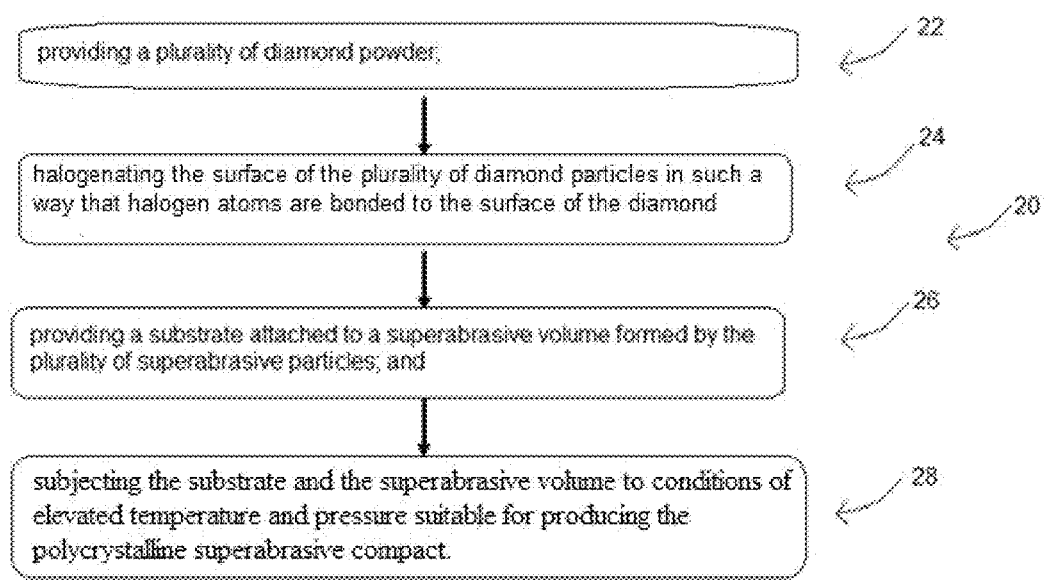
FIG. 2 is a flow chart illustrating a method of manufacturing polycrystalline compact according to an embodiment.

As shown in FIG. 2, a method 20 of making superabrasive compact may comprise the steps of providing a plurality of diamond particles in a step 22; halogenating the surface of the plurality of diamond particles in a such that halogen atoms are bonded to the surface of diamond particles in a step 24; providing a substrate attached to a volume formed by the plurality of surface halogenated diamond particles in a step 26; and subjecting the substrate and the volume to conditions of high temperature and pressure suitable for producing the polycrystalline diamond compact in a step 28.

In the method 20, the substrate may be cemented tungsten carbide. Halogenating step 24 may comprise the further reaction of the halogenated diamond surface with a chemical agent, selected from the group of amine, amino derivative, vinyl, phenolic, alcohol, amide, aldehyde, epoxide molecules, or other inorganic or organic molecules, to chemically bond corresponding chemical groups to the diamond surface. More specifically, the halogenating step 24 may include a step of preparing a hydrogen terminated diamond surface with subsequent replacement of surface hydrogen atoms with halogen atoms, making a halogen terminated diamond, e.g. a chlorine or fluorine terminated diamond, and further replacement of halogen atoms with other chemical groups or atoms. The superabrasive particles may be at least one of cubic boron nitride, diamond, and diamond composite materials. Surface functionalization of diamond powder in step 24 may comprise other surface treatment steps besides the halogenation, such as oxidation (0-800° C. in air, for example), heating in vacuum, hydrogenation, graphitization, plasma treatment, etc. The graphitizing step may comprise transformation of a part of diamond into graphite at high temperature.

One or more additional surface functionalization or surface treatment steps may be inserted in between or substituted for each of the foregoing steps 22-28 without departing from the scope of this disclosure.

Initially, the diamond surface may be hydrogenated or hydrogen terminated. The hydrogenating step can comprise heating the diamonds to a temperature in a range from about 700° C. to about 1200° C. in a hydrogen-containing environment, e.g. in a pure hydrogen or in a mixture of hydrogen and an inert gas. The hydrogenated diamond surface should have a majority of surface carbon atoms bonded to hydrogen atoms, that is hydrogen terminated in significant extent, for example more than about 90%. The hydrogenated diamond surfaces then may be halogenated. The hydrogenated diamond may be subjected to one of the following processes: fluorination, chlorination, bromination, or iodination.

The step of halogenation may comprise steps of heating the hydrogenated diamond to a temperature in a range from about 0° C. to about 500° C. in a halogen gas (e.g. fluorine gas, chlorine gas, bromine gas, or iodine gas) containing environment, such as a closed reactor or an open flow reactor. Halogen gas may be diluted by other gases, such as by inert gases, for example. Pressure in halogen gas containing reactor may be significantly lower or higher than ambient atmospheric pressure or equal to an ambient pressure.

The hydrogenating and chlorinating reactions are indicated schematically in Equations (1) and (2), respectively.

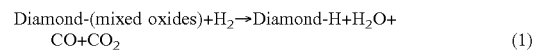

$$\text{Diamond-(mixed oxides)} + H_2 \rightarrow \text{Diamond-H} + H_2O + CO + CO_2 \quad (1)$$

$$\text{Diamond-H} + Cl_2 \rightarrow \text{Diamond-Cl} + HCl \quad (2)$$

Alternatively, the halogenation step may be performed by photochemical reaction, exposing the diamond powder to ultraviolet radiation in a halogen containing environment. The ultraviolet radiation may produce highly reactive halogen atoms attaching to the diamond surface. The ultraviolet radiation may be provided by in different ways, such as from a lamp, laser, accelerator, as a solar radiation.

Alternatively, the halogenation step may be performed by plasma containing halogen molecules; exposing the diamond powder to plasma environment containing particular halogen containing molecules. For example, using fluorine containing plasma, chlorine containing plasma, bromine containing plasma, or iodine containing plasma. Plasma may be created and provided by many ways, such as a low pressure plasma, glow discharge plasma, atmospheric pressure plasma, high pressure plasma, DC plasma, microwave plasma, RF plasma, laser plasma, arc plasma, flame, and torch.

Further examples may describe the chlorination of diamond surface, but those examples do not limit the scope of the invention and can be extended to other halogen moieties.

The chlorinated diamond may react with hydrogen-containing molecules to produce molecules that are bound to diamond and HCl, particularly if the hydrogen atom(s) are more reactive than those in aliphatic hydrocarbons. Exposure of chlorinated diamond to water vapor at room temperature can produce OH groups that are bound to the diamond surface. Halogenated diamond surface has a high chemical reactivity towards a variety of chemical compounds, which allows successful functionalization of diamond surface, representing a bonding to the diamond surface different chemical organic and inorganic groups displacing surface halogen atoms. For example, organic chemical groups may include, but not limited to, alkyl, alkene, aryl, polyene chains, organic polymers, proteins, etc.

Chemical groups attached to the surface may be selected from a variety of organic groups such as alkenes, alkynes, alcohols, thiols, amines, halides, aldehydes, ketones, amides, carboxylic acids, carboxylic acid ethers, acrylates, methacrylates, vinyl ethers, acrylamides, azides, nitriles, dienes, trienes, polyenes, phosphines, phosphates, phosphonatees, isocyanates, silanols, oximes, diazo, epoxides, nitro, sulphate, sulphonate, anhydrites, guanadino, phenolics, imines, diols, thiols, hydrazones, hydrazines, dilulfides, sulfides, sulfones, suifoxides, peroxides, ureas, thioureas, diazonium, azo, DNA, RNA, protein, carbohydrates, lipids, and styrene.

For example, surface vinyl groups may be attached to the diamond surface producing functionalized diamonds. The vinyl groups for functionalized diamonds may be produced by reacting chlorinated diamond with propylene at a temperature in a range between about 100° C. and about 600° C. Allylic C—H bonds are more reactive than normal aliphatic C—H bonds, and therefore a reaction as in Equation (3) can occur:

$$\text{Diamond-Cl} + \text{C}_3\text{H}_6 \rightarrow \text{Diamond-CH}_2\text{CH}=\text{CH}_2 + \text{HCl} \quad (3)$$

Alternatively, reaction of diamond with propylene may be performed by photochemical reaction, exposing the diamond powder to ultraviolet radiation in a propylene-containing environment.

Similarly, surface phenolic groups may be attached to diamond surface forming functionalized diamonds, as embodied by the invention. The surface phenolic groups on functionalized diamonds may be produced by reacting chlorinated diamond with p-cresol at a temperature in a range between about 50° C. and about 600° C. This reaction occurs as methyl C—H bonds in toluene may be generally weaker than aromatic C—H bonds, and thus a reaction as set forth in Equation (4) can occur:

$$\text{Diamond-Cl} + \text{Me-pphen-OH} \rightarrow \text{Diamond-CH}_2\text{-pphen-OH} + \text{HCl} \quad (4)$$

Alternatively, reaction of the chlorinated diamond with cresol can be performed by photochemical reaction, exposing the diamond powder to ultraviolet radiation in a cresol-containing environment.

Chlorinated diamond reacts more readily with O—H and N—H bonds than it does with C—H bonds, and the vinyl, phenolic, alcohol, amide, aldehyde, and epoxide moieties of the present invention may be formed by reactions with appropriate alcohols or amines.

Vinyl, alcohol, amide, aldehyde, phenolic, and epoxide groups may be attached to the diamond surface by reacting chlorinated diamond with polyfunctional alcohols at a temperature between about 0° C. and about 600° C., as indicated in Equations (5) through (8), respectively:

$$\text{Diamond-Cl} + \text{HO(CH}_2)_x\text{CH}=\text{CH}_2 \rightarrow \text{Diamond-O(CH}_2)_x\text{CH}=\text{CH}_2 + \text{HCl} \quad (5)$$

$$\text{Diamond-Cl} + \text{HOCH}_2(\text{CH}_2)_x\text{OH} \rightarrow \text{Diamond-OCH}_2(\text{CH}_2)_x\text{OH} + \text{HCl} \quad (6)$$

$$\text{Diamond-Cl} + \text{HO(CH}_2)_x\text{CONH}_2 \rightarrow \text{Diamond-O(CH}_2)_x\text{CONH}_2 + \text{HCl} \quad (7)$$

$$\text{Diamond-Cl} + \text{HO(CH}_2)_x\text{COH} \rightarrow \text{Diamond-O(CH}_2)_x\text{COH}_2 + \text{HCl} \quad (8)$$

Alternatively, vinyl, alcohol, amide, aldehyde, phenolic, and epoxide groups may be attached to the diamond surface by reacting chlorinated diamond with polyfunctional amines at a temperature between about 0° C. and about 600° C., as indicated in Equations (9) through (13), respectively:

$$\text{Diamond-Cl} + \text{H}_2\text{N(CH}_2)_x\text{CH}=\text{CR}_2 \rightarrow \text{Diamond-NH}(\text{CH}_2)_x\text{CH}=\text{CR}_2 + \text{HCl} \quad (9)$$

$$\text{Diamond-Cl} + \text{H}_2\text{NCH}_2(\text{CH}_2)_x\text{OH} \rightarrow \text{Diamond-NHCH}_2(\text{CH}_2)_x\text{OH} + \text{HCl} \quad (10)$$

$$\text{Diamond-Cl} + \text{H}_2\text{N(CH}_2)_x\text{CONH}_2 \rightarrow \text{Diamond-NH}(\text{CH}_2)_x\text{CONH}_2 + \text{HCl} \quad (11)$$

$$\text{Diamond-Cl} + \text{H}_2\text{N(CH}_2)_x\text{COH} \rightarrow \text{Diamond-NH}(\text{CH}_2)_x\text{COH}_2 + \text{HCl} \quad (12)$$

$$\text{Diamond-Cl} + \text{H}_3\text{N} \rightarrow \text{Diamond-NH}_2 + \text{HCl} \quad (13)$$

In each of the reactions in Equations (1-13), x is an integer between 0 and about 20. This value for x should allow for variable distances between the diamond surface and polymerizable functional group, for example, a polymerizable functional group selected from phenolic, vinyl, hydroxyl, amide, or aldehyde groups. The reactions set forth in Equations (1-13) may provide enhanced PCD compact performance in rock drilling applications.

EXAMPLE I

About 15-25 microns of diamond powder was placed in a flow chemical reactor. Initially the air was removed from the reactor by purging it with argon gas and then the reactor was filled with chlorine gas and heated to 300° C. After 1 hour of treatment, chlorine gas was purged out by argon gas and the reactor was allowed to cool down to room temperature. Subsequently, the chlorinated diamond powder was used in fabrication of PDC compact.

The method of fabrication was similar to a conventional PDC fabrication process. The diamond powder was added into a cup of refractory metal and encased in the cup with a source of cobalt. The cup was then surrounded by gasket material and subjected to HPHT conditions (50 to 80 kbar, 1200 to 1800° C.) in a hydraulic press. At these HPHT conditions, the cobalt melted and infiltrated the pack bed of diamond powder. Diamond went into solution in the metal catalyst and re-precipitated out at contact points between diamond crystals eventually forming an interlinked rigid structure of polycrystalline diamond.

PDC compacts were subjected to an abrasion test, representing a standard vertical turret lather test using flushing water as a coolant (VTL-c). The PDC compact was oriented at a 15° back rake angle against the surface of Barre Gray Granite rock wheel having a 1.82 m diameter. Such rock materials comprised a compressive strength of about 200 MPa. The tested compact traveled on the surface of the granite wheel while the cutting element was held constant at a 0.36 cm depth of cut and the feed was 0.36 mm/revolution.

Figure 3:
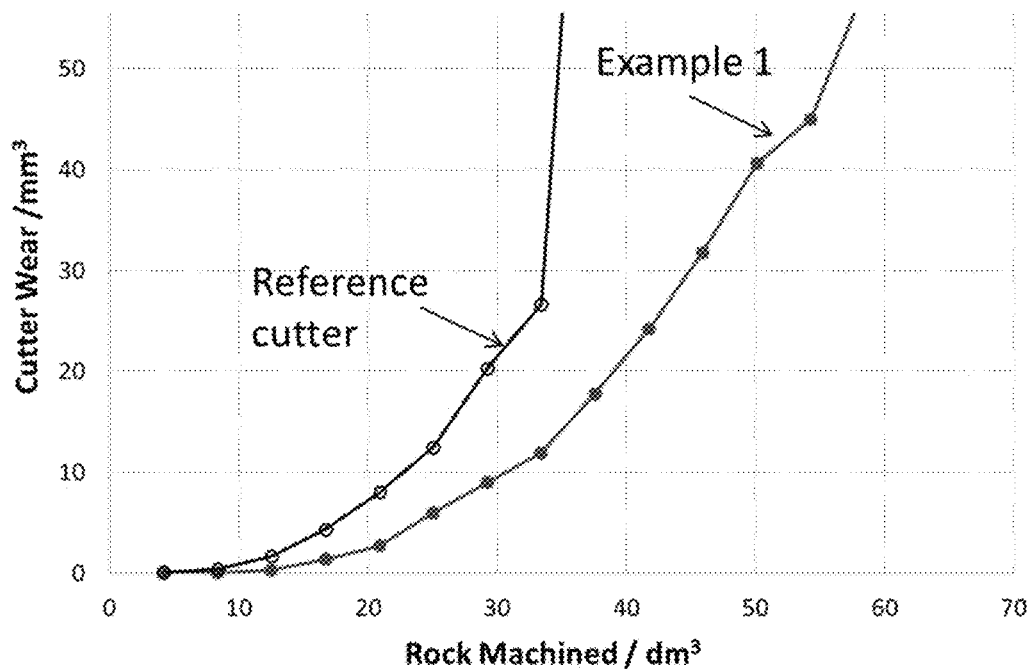
FIG. 3 shows VTL-c abrasion test results for a standard reference made without surface functionalization of diamond feed and an example compact made according to an embodiment with surface chlorination of diamond feed.

VTL-c abrasion testing results, plotted as dependence of wear volume of compact versus removed volume of rock, are shown in FIG. 3. Two solid lines represent a reference PDC compact made from diamond powder without its chlorination and example 1 of the PDC compact made from chlorinated diamond powder using the same fabrication process as for a reference compact. It could be seen that, the PDC compact fabricated from chlorinated diamond powder demonstrated lower wear and longer life-time than the reference compact fabricated in similar process, but without chlorination.

EXAMPLE II

Diamond powder similar to Example 1 was placed in the flow chemical reactor. Initially the air was removed from the reactor by purging argon gas and then the reactor was filled with chlorine gas and heated to 300° C. After 1 h of chlorine treatment, chlorine gas was replaced with ammonia gas.

After 1 h of ammonia treatment, the reactor was allowed to cool down to room temperature and ammonia gas was purged out by argon gas. Subsequently, the aminated diamond powder was used in fabrication of PDC compact.

Figure 4:
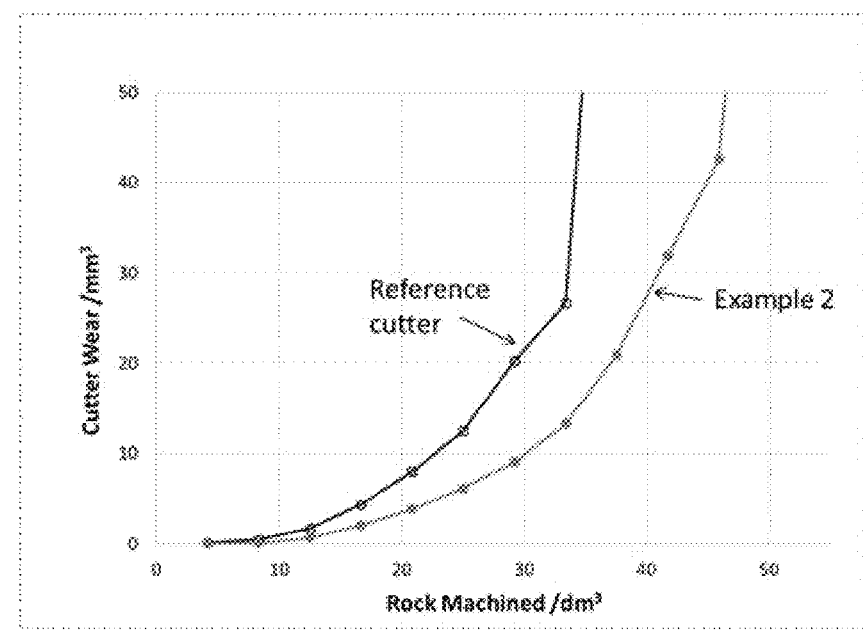
FIG. 4 shows VTL-c abrasion test results for a standard reference compact made without surface functionalization of diamond feed and an example compact made according to another embodiment with surface amination of diamond feed.

Fabricated PDC compacts were subjected to standard abrasive VTL-c test and the results are shown in FIG. 4. The PDC cutting inserts fabricated from aminated diamond powder demonstrated lower wear and longer life-time than the compact fabricated in similar process, but without diamond powder amination.

EXAMPLE III

Diamond powder similar to Example 1 was placed into the closed plasma chemical reactor. Initially, the air was removed from the reactor by purging argon gas and then the reactor was filled with a mixture containing inert gas and $SF_6$ gas. Plasma was ignited and the powder was exposed to plasma for 30 min. Subsequently, the fluorinated diamond powder was used in the fabrication of PDC cutting inserts.

Figure 5:
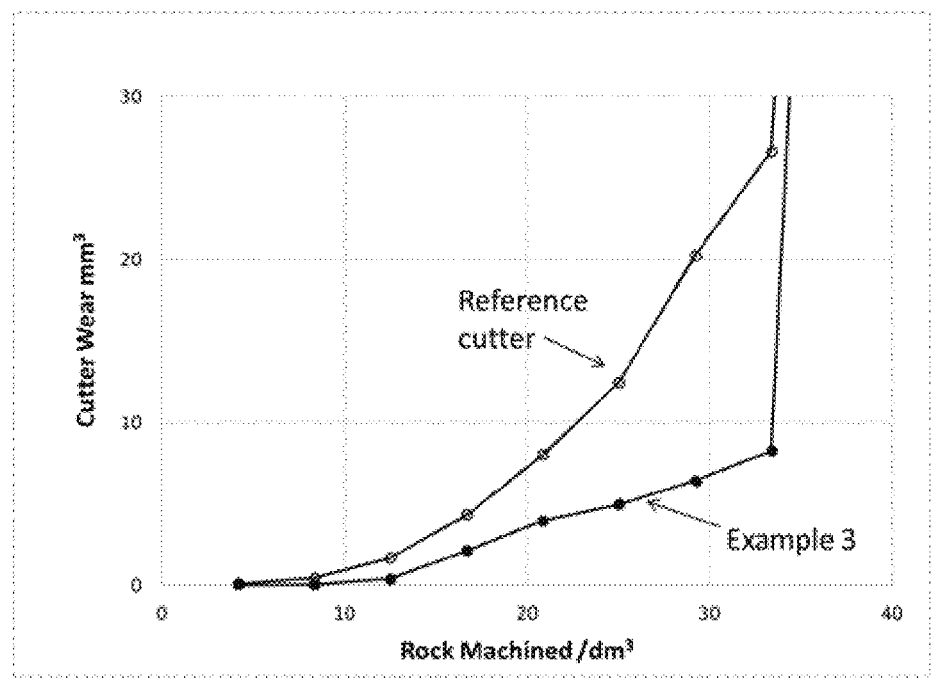
FIG. 5 shows VTL-c abrasion test results for a standard reference made without surface functionalization of diamond feed and a compact made according to yet another embodiment with surface fluorination of diamond feed.

Fabricated PDC compacts were subjected to standard abrasive VTL-c test and the results are shown in FIG. 5. The PDC cutting insert fabricated from fluorinated diamond powder demonstrated lower wear and longer life-time than the cutting insert fabricated in similar process, but without powder fluorination.

The compact was placed in a fixture and leached in the conventional way to a depth of 300 microns, representing the depth of cobalt depletion from the compact surface. Methods for making leached diamond compacts and composite compacts are more fully described in U.S. Pat. No. 3,745,623. The majority of metal residing in the interstices between the diamond grains was removed by the leaching process. In this case, the acid was a mixture of concentrated nitric acid, hydrochloric acid, and hydrofluoric acid in a volume ratio of 3:9:4 respectively. To accelerate the leach, the acid mixture was heated to just below the boiling point, namely 185 F. The leaching process was carried out over the period of 72 hours. At the end of the specified leaching time, conventionally, the compact were removed from the hot acid and thoroughly washed to remove acid from the compact.

The compacts were cooled gradually in the acid, allowing for a range of chemical activity and diffusion rates of the acid within the leach pores of the compact. Specifically, allowing the compacts to reside in the acid for 2.5 hours during which time the temperature of the acid was gradually cooled from the normal leaching temperature of 185 F to room temperature, nominally 70 F. This gradual adjusting of the activity and diffusion in the system allowed for the leaching process to continue in larger leach pores for an extended period of time while smaller leach pores were slowed dramatically. The superabrasive volume of PCD compacts was substantially free of catalyst, such as cobalt.

While reference has been made to specific embodiments, it is apparent that other embodiments and variations can be devised by others skilled in the art without departing from their spirit and scope. The appended claims are intended to be construed to include all such embodiments and equivalent variations.

The invention claimed is:

1. A method of making a superabrasive compact, comprising:
   providing a plurality of monocrystalline diamond particles;
   hydrogenating the plurality of monocrystalline diamond particles to form a surface of the plurality of monocrystalline diamond particles that is hydrogen terminated;
   halogenating the hydrogenated surface of the plurality of monocrystalline diamond particles in such a way that halogen atoms are bonded to the surface of the monocrystalline diamond particles;
   providing a substrate attached to a superabrasive volume formed by the plurality of monocrystalline diamond particles; and
   subjecting the substrate and the superabrasive volume to conditions of elevated temperature and pressure suitable for producing the polycrystalline superabrasive compact.

2. The method of the claim 1, wherein the substrate is cemented tungsten carbide.

3. The method of the claim 1, further comprising oxidizing the plurality of monocrystalline diamond particles.

4. The method of the claim 1, further comprising reacting the halogenated diamond surface with a subsequent derivatizing agent to yield a subsequently derivatized diamond surface.

5. The method of the claim 1, further comprising graphitizing the plurality of monocrystalline diamond particles into graphite.

6. The method of the claim 1, wherein the halogenating step includes replacing hydrogen terminated diamond with halogen terminated diamond.

7. The method of the claim 1, wherein hydrogenating comprises heating the diamonds to a temperature in a range from about 700° C. to about 1200° C. in a hydrogen-containing environment.

8. The method of the claim 1, wherein the hydrogenated surface of the plurality of monocrystalline diamond particles more than 90% hydrogen terminated.

9. The method of the claim 1, wherein halogenating comprises heating the plurality of monocrystalline diamond particles to a temperature in a range from about 0° C. to about 500° C. in a halogen gas containing environment.

10. The method of the claim 1, wherein halogenating comprises a photochemical reaction process, the photochemical reaction process including exposing the plurality of monocrystalline diamond particles to ultraviolet radiation in a halogen gas containing environment.

11. The method of the claim 1, wherein halogenating includes a plasma process, the plasma process including exposing the plurality of monocrystalline diamond particles to a plasma environment containing halogen containing molecules.

* * * * *